(12) United States Patent
Matsuyama

(10) Patent No.: US 8,810,709 B2
(45) Date of Patent: Aug. 19, 2014

(54) IMAGE CAPTURING APPARATUS AND CONTROL METHOD THEREOF

(75) Inventor: Ichiro Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/597,941

(22) Filed: Aug. 29, 2012

(65) Prior Publication Data

US 2013/0070145 A1 Mar. 21, 2013

(30) Foreign Application Priority Data

Sep. 20, 2011 (JP) ................. 2011-205234

(51) Int. Cl.
*H04N 5/222* (2006.01)
*H04N 5/232* (2006.01)

(52) U.S. Cl.
CPC ....... *H04N 5/23212* (2013.01); *H04N 5/23216* (2013.01)
USPC ..................... 348/333.01; 348/345

(58) Field of Classification Search
CPC .......... H04N 5/23212; H04N 5/23216; H04N 5/23293; G02B 7/28
USPC ................ 348/311.01, 311.02, 345, 346, 349
See application file for complete search history.

(56) References Cited

U.S. PATENT DOCUMENTS

| | | | |
|---|---|---|---|
| 2010/0020221 A1 | 1/2010 | Tupman et al. | |
| 2011/0019058 A1* | 1/2011 | Sakai et al. | 348/333.01 |
| 2011/0141145 A1 | 6/2011 | Liang et al. | |
| 2011/0267530 A1 | 11/2011 | Chun | |
| 2012/0120277 A1* | 5/2012 | Tsai | 348/223.1 |
| 2013/0002802 A1* | 1/2013 | Mock | 348/14.03 |
| 2013/0033448 A1 | 2/2013 | Yano et al. | |
| 2013/0063644 A1* | 3/2013 | Jones et al. | 348/333.01 |

FOREIGN PATENT DOCUMENTS

| | | |
|---|---|---|
| JP | 2010-093422 A | 4/2010 |
| JP | 2010-160581 A | 7/2010 |
| JP | 2011-039457 | 2/2011 |
| WO | 2011/102406 A1 | 8/2011 |

OTHER PUBLICATIONS

European Search Report issued on Sep. 24, 2013, that issued in the corresponding European Patent Application No. 12184210.8.

* cited by examiner

*Primary Examiner* — Timothy J Henn

(74) *Attorney, Agent, or Firm* — Cowan, Liebowitz & Latman, P.C.

(57) ABSTRACT

An image capturing apparatus comprises an image capturing unit configured to capture an image of an object via an optical system, a display unit configured to display the image captured by the image capturing unit on a screen, a detection unit configured to simultaneously detect a plurality of touch positions on the screen on which the image is displayed, and a control unit configured to adjust a focus state in accordance with a change in a distance between a first detected touch position and a second detected touch position, so as to change a focus area.

12 Claims, 15 Drawing Sheets

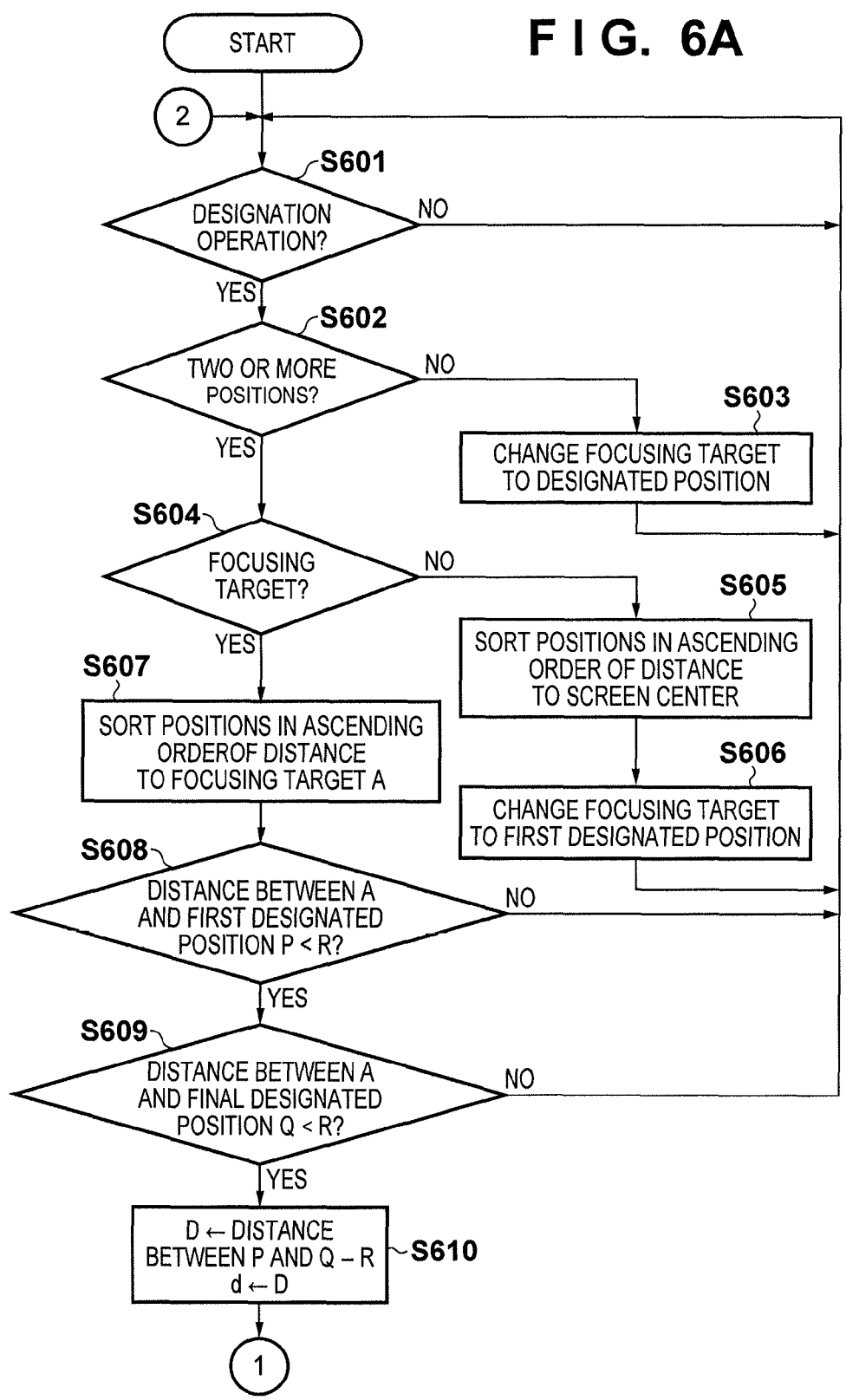

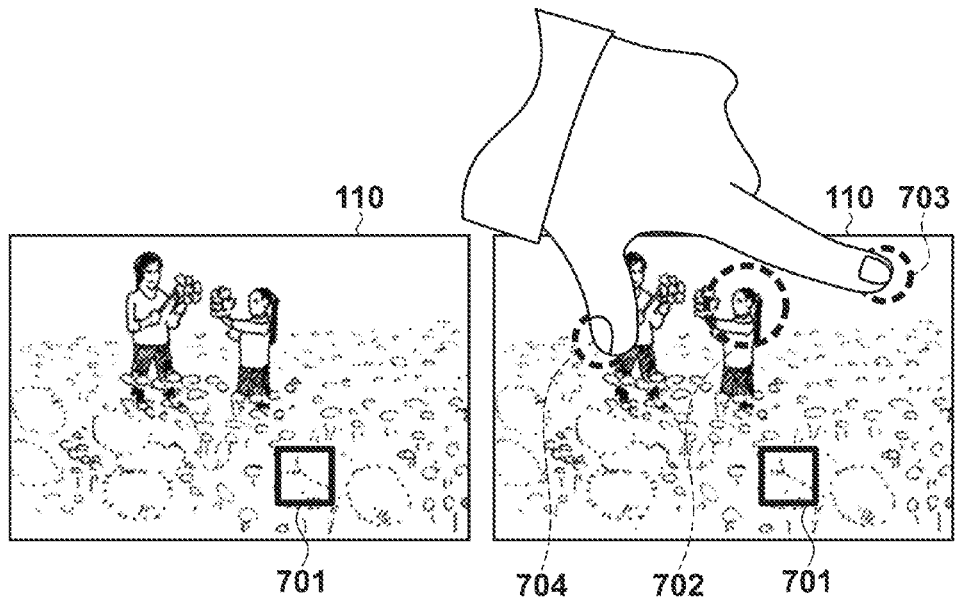
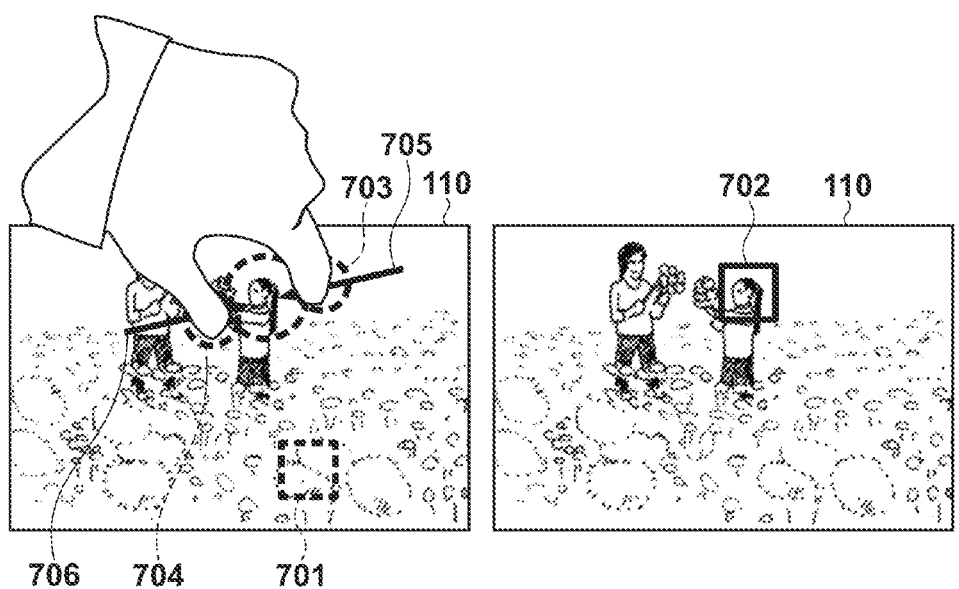
FIG. 7A  FIG. 7B
FIG. 7C  FIG. 7D

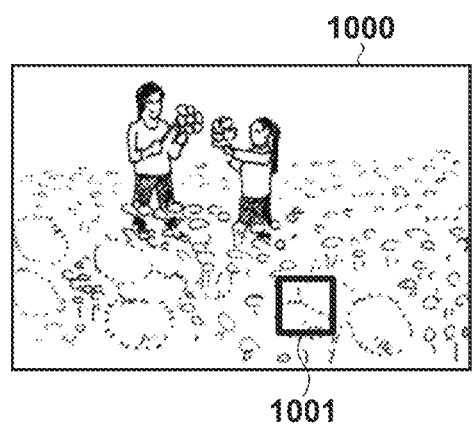
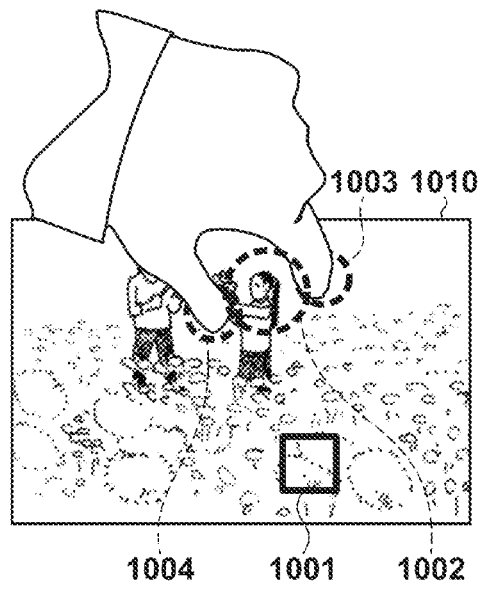
FIG. 10A    FIG. 10B
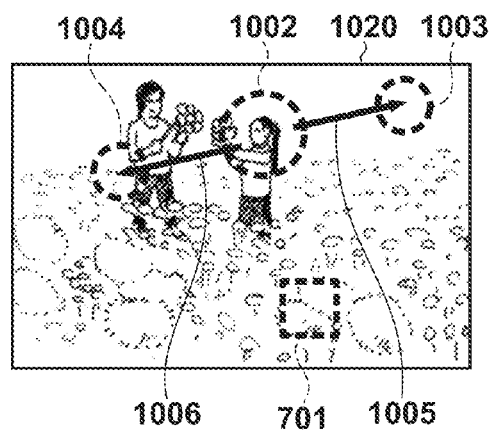
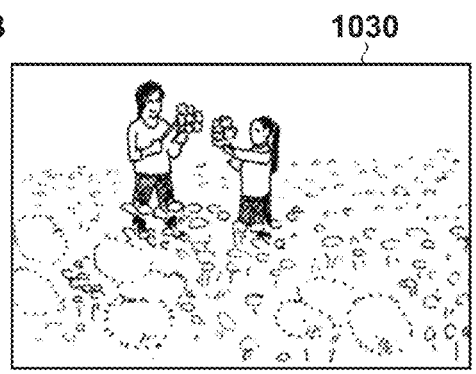
FIG. 10C    FIG. 10D

IMAGE CAPTURING APPARATUS AND CONTROL METHOD THEREOF

BACKGROUND OF THE INVENTION

1. Field of the Invention

The present invention relates to a focus moving control technique of arbitrarily moving a focusing target in accordance with a user operation on an image capturing apparatus.

2. Description of the Related Art

Some recent image capturing apparatuses such as digital video cameras and digital still cameras have a function of automatically focusing on an arbitrary object when the user touches the object on the display screen where the object is displayed (for example, Japanese Patent Laid-Open No. 2011-039457).

In addition to the function of focusing on a desired object, users want to express a captured video as an image intentionally thrown out of focus. In addition, when a focus area is designated by touching a display screen including an operation means such as a touch panel, as in Japanese Patent Laid-Open No. 2011-039457, the user may temporarily hide the target object portion with a finger or the like and miss a motion or facial expression.

SUMMARY OF THE INVENTION

The present invention has been made in consideration of the aforementioned problems, and realizes a technique of performing an operation of moving a focusing target so as to adjust the focus state of a video under capturing by a simple operation without missing the object under capturing.

In order to solve the aforementioned problems, the present invention provides an image capturing apparatus comprising: an image capturing unit configured to capture an image of an object via an optical system; a display unit configured to display the image captured by the image capturing unit on a screen; a detection unit configured to simultaneously detect a plurality of touch positions on the screen on which the image is displayed; and a control unit configured to control adjust a focus state gradually in accordance with a change in a distance between a first detected touch position and a second detected touch position, so as to change a focus area.

In order to solve the aforementioned problems, the present invention provides a control method of an image capturing apparatus which comprises an image capturing unit configured to capture an image of an object via an optical system, and a display unit configured to display the image captured by the image capturing unit on a screen, the method comprising: a detection step of simultaneously detecting a plurality of touch positions on the screen on which the image is displayed; and a control step of adjusting a focus state gradually in accordance with a change in a distance between a first detected touch position and a second detected touch position, so as to change a focus area.

According to the present invention, it is possible to perform an operation of moving a focusing target so as to adjust the focus state of a video under capturing by a simple operation without missing the object under capturing.

Further features of the present invention will become apparent from the following description of exemplary embodiments (with reference to the attached drawings).

BRIEF DESCRIPTION OF THE DRAWINGS

FIGS. 6A and 6B are flowcharts of focus moving control according to the first embodiment;

FIGS. 7A to 7D are schematic views showing a first operation example according to the second embodiment;

FIGS. 10A to 10D are schematic views showing a second operation example according to the second embodiment;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An embodiment will now be described in which an image capturing apparatus according to the present invention is applied to, for example, a digital video camera (to be referred to as "camera" hereinafter) for capturing a moving image.

<Apparatus Configuration>

The configuration of a camera 100 according to this embodiment will be described with reference to FIGS. 1 and 2.

Figure 1:
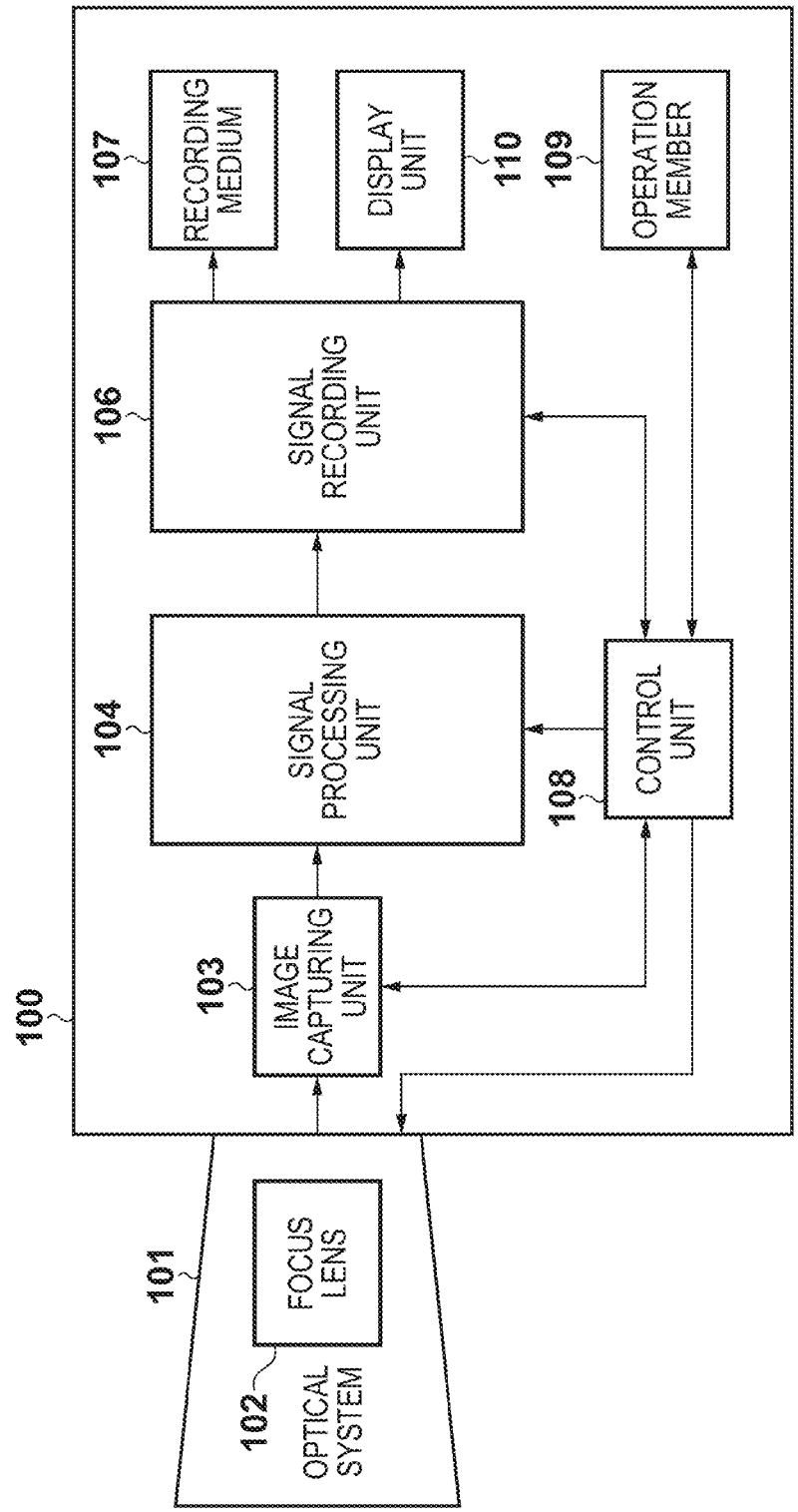
FIG. 1 is a block diagram of an image capturing apparatus according to an embodiment of the present invention.

Referring to FIG. 1, an optical system 101 is formed from a zoom lens group, a stop, an ND (Neutral Density) filter, and the like. Reference numeral 102 denotes a focus lens. An image capturing unit 103 includes an image sensor such as a CCD or a CMOS, and is formed from a sample and hold circuit (S/H circuit), a preprocess circuit, and the like. Reference numeral 104 denotes a signal processing unit; 106, a signal recording unit; and 107, a recording medium such as a flash memory. A control unit 108 controls the whole camera. An operation member 109 is formed from a capacitance type touch panel or the like. A display unit 110 is formed from a liquid crystal panel or the like, and displays a video signal to be used by the user to confirm an object.

The amount of light received from an object via the lenses of the optical system 101 is adjusted by the stop and the ND filter. In the image capturing unit 103, an image of the light from the object is formed on the light-receiving surface of the image sensor so that the light is accumulated as video signal charges by photoelectric conversion. The video signal output from the image capturing unit 103 undergoes sample and hold processing in the sample and hold circuit. The video signal is supplied to the preprocess circuit so as to undergo AGC processing, black balance processing, white balance processing, gamma correction processing, and the like, and then supplied to the signal processing unit 104. The signal processing unit 104 executes processing, correction, and the like for the video signal based on an instruction from the control unit 108, and outputs the processed and corrected video signal to the signal recording unit 106.

Based on an instruction from the control unit 108, the signal recording unit 106 superimposes a graphic such as a frame on the received video signal and displays it on the display unit 110. In parallel to this processing, the signal recording unit 106 performs intra-frame coding or interframe coding of the video signal and records it in the recording medium 107.

The operation member 109 sends a position designated by the user to the control unit 108. Even when the user simultaneously designates a plurality of positions, the plurality of positions can be sent simultaneously. The control unit 108 controls the entire camera in accordance with the contents of the received user designation.

Note that when the operation member 109 includes a touch panel, the control unit 108 can detect the following operations on the touch panel: touching the touch panel with a finger or a pen (to be referred to as "touch down" hereinafter); keeping the finger or pen in contact with the touch panel (to be referred to as "touch on" hereinafter); moving the finger or pen kept in contact with the touch panel (to be referred to as "move" hereinafter); releasing the finger or pen from the touch panel (to be referred to as "touch up" hereinafter); and a state in which nothing is in contact with the touch panel (to be referred to as "touch off" hereinafter). Each operation and the position coordinates of the finger or pen in contact with the touch panel are sent to the control unit 108. The control unit 108 determines, based on the received information, which operation has been done on the touch panel. As for the move, even the moving direction of the finger or pen that moves on the touch panel can be determined for each of the vertical and horizontal components on the touch panel based on a change in the position coordinates. An operation from touch down on the touch panel to a predetermined move and then to touch up is assumed to be a stroke. A quick stroke operation is called a flick. The flick is an operation of quickly moving a finger kept in contact with the touch panel by a certain distance and then directly releasing it. In other words, the flick is an operation of quickly tracing the touch panel surface in a flipping-like movement. Upon detecting a move for a predetermined distance or more at a predetermined speed or more and then a direct touch up, it can be determined that a flick has been performed. If a move for a predetermined distance or more at a speed lower than the predetermined speed is detected, it is determined that a drag has been performed. A touch panel of any one of various types such as a resistive type, a capacitance type, a surface acoustic wave type, an infrared type, an electromagnetic induction type, an image recognition type, or an optical sensor type is usable.

The signal processing unit 104 executes signal processing of a type of obtaining the contrast of a video signal or signal processing of a type of obtaining the phase difference so as to obtain a focus evaluation value.

In contrast obtaining type focus adjustment, the sharpness of an object image formed by the optical system 101 is obtained by evaluating the video signal using a predetermined function. Then, the position of the focus lens 102 on the optical axis is adjusted so that the sharpness takes an extreme value. As the evaluation function, the absolute value of the luminance signal difference between adjacent pixels is added in a focus detection area, or the square of the luminance signal difference between adjacent pixels is added in a focus detection area. Since the focus detection area can arbitrarily be set from a video signal, focus adjustment can be done for an arbitrary location of an object in the captured image.

Generally, in the above-described contrast detection type focus detection, the evaluation function value is obtained while slightly moving the focus lens 102. Hence, focus adjustment requires a time until focus is obtained.

In phase difference obtaining type focus adjustment, however, object images are formed using two light beams that have passed through different portions of the lenses of the optical system 101. The positional phase difference between the two object images is detected based on the output of the image sensor and converted into the defocus amount of the optical system.

For example, an image sensor for phase difference detection is provided as a phase difference sensor separately from the image sensor of the image capturing unit 103 so that an image of light from an object, which is split by the optical system 101, is formed on the light-receiving surface of the phase difference sensor. Alternatively, an optical system different from the image sensor of the image capturing unit 103 is provided to form an image of an object. In these cases, the position or range to perform focus adjustment for an object in a captured image may be limited in accordance with the number of optical systems or phase difference sensors and the position or range where an optical system or a phase difference sensor is provided.

On the other hand, a plurality of photoelectric conversion areas are provided in each pixel of the image sensor of the image capturing unit 103 so as to allow the image sensor to detect the phase difference. In this configuration, the plurality of photoelectric conversion areas receive, via microlenses or the like provided on the pixel basis, two light beams that have passed through different portions of the lenses of the optical system 101 so as to obtain a plurality of video signals having different phases from the image sensor, and perform phase difference detection. In this case, since the focus detection area can arbitrarily be set from a video signal, focus adjustment can be done for an arbitrary location of an object in the captured image, like the contrast obtaining type.

In the above-described phase difference detection type focus detection, the target position of the focus lens 102 can be calculated by obtaining the defocus amount. It is therefore possible to make the time until focus is obtained shorter than in the contrast detection type.

To obtain a focus evaluation value, the signal processing unit 104 arbitrarily sets a focus detection area from a video signal or sets a focus detection area using a method for minimizing the limitation on a detectable position or range.

A result obtained by evaluating the focus state (in-focus state) using the above-described detection type is sent to the control unit 108 as a focus evaluation value. The control unit 108 calculates the driving amount of the focus lens 102 based on the received focus evaluation value, and instructs the optical system 101 to drive the focus lens 102.

Figure 2:
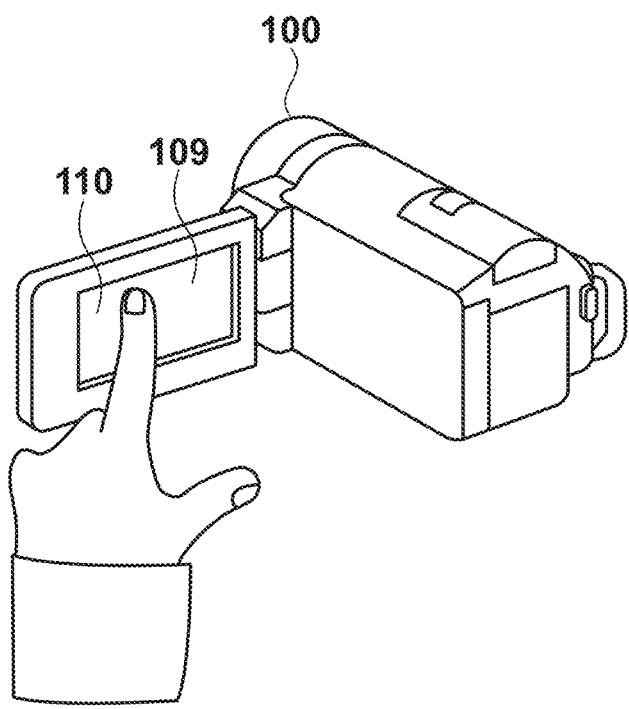
FIG. 2 is a perspective view showing the outer appearance of the image capturing apparatus according to the embodiment.

FIG. 2 is a perspective view showing the outer appearance of the camera 100 according to this embodiment. The operation member 109, such as a touch panel, is integrated with the display unit 110, such as a liquid crystal panel. The user can designate a desired area by a touch operation while confirming an object or a graphic such as a frame displayed.

<Description of Operation>

A user operation in focus moving control according to this embodiment will be described with reference to FIGS. 3A to 3D.

Figure 3A:
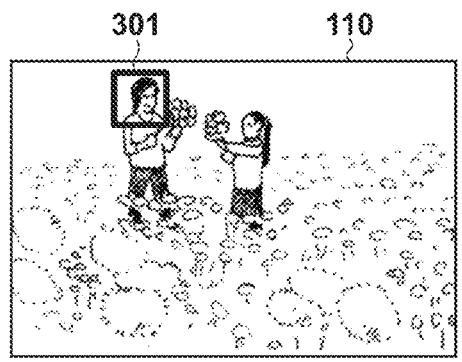
FIGS. 3A to 3D are schematic views showing an operation example of focus moving control according to the first embodiment.

Referring to FIG. 3A, a scene with two persons—a man and a woman in a flowery field—is displayed on the display unit 110 as a captured object. A frame 301 indicates that the control unit 108 has selected the area of the face of the man included in the frame 301 as the current focus adjustment target area (to be referred to as "first focusing target" hereinafter). In this case, the first focusing target is assumed to actually be in focus. In the following explanation, the user is assumed to perform an operation of selecting the flowery field on the near side as a new focusing target (second focusing target) and gradually moving the focus area.

Figure 3B:
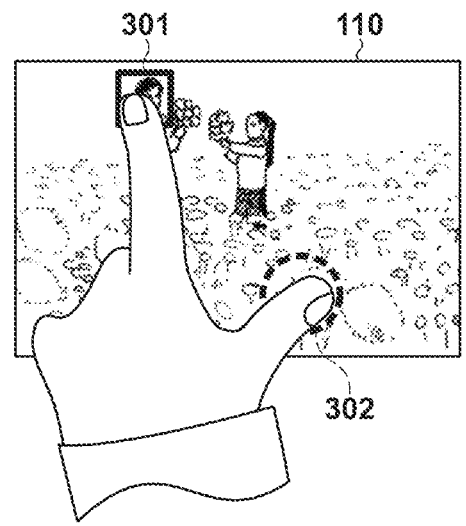

In FIG. 3B, the user touches two portions, the frame 301 and the flowery field on the near side, simultaneously with the index finger and the thumb, thereby designating the two points on the image displayed on the display unit 110. A frame 302 displayed at the area designated by the thumb indicates that the control unit 108 has determined that the location of the object surrounded by the frame 302 represents the second focusing target desired by the user.

Figure 3C:
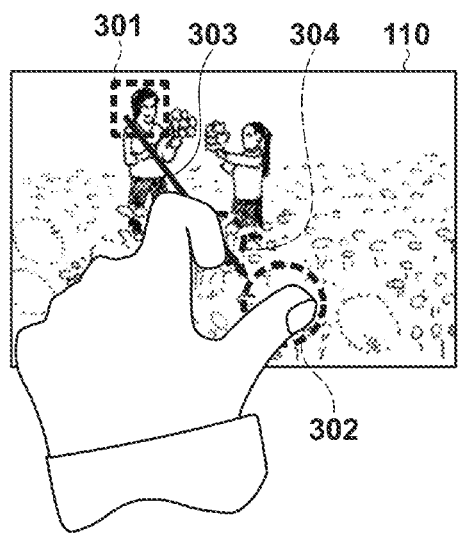

In FIG. 3C, the first touch position designated by the user's index finger comes close to the second touch position designated by the thumb. A frame 304 is displayed at the first touch position designated by the moving index finger, indicating that the control unit 108 is tracking the touch position designated by the user. The control unit 108 changes the focus area in accordance with the positional relationship between the first touch position and the second touch position. More specifically, the focus area is gradually moved in accordance with the speed of the change in the distance between the first area and the second area. In addition, an arrow 303 is displayed as a guide from the first touch position first designated by the index finger to the frame 302 indicating the second focusing target.

Figure 3D:
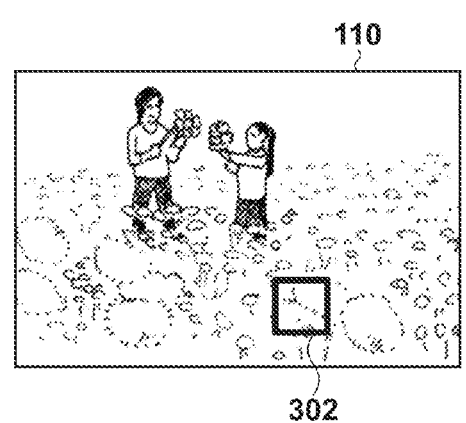

FIG. 3D shows a display result after the first touch position designated by the user's index finger has reached the frame 302. This indicates that the control unit 108 has selected the location of the object existing within the range surrounded by the frame 302 as the new second focusing target, and the flowery field on the near side is in focus. The focus moving control is completed, and the frames 301 and 304 and the arrow 303 are erased.

As for the shape of each frame displayed, the first focusing target before the focus moving control is indicated by a rectangle in solid lines, the first focusing target before movement halfway through the focus moving control is indicated by a rectangle in broken lines, and the second focusing target after movement is indicated by a circle in a broken line. The touch position during movement is indicated by a small circle in a broken line. The user can easily confirm whether the control unit 108 is performing focus moving control as intended by viewing the shape of each frame.

<Lens Position Control>

Processing of causing the control unit 108 to select a focusing target from two points designated in response to a user's touch operation on the operation member 109 and calculate the position of the focus lens 102 in the focus moving control shown in FIGS. 3A to 3D will be described with reference to FIGS. 4A to 5.

Figure 4A:
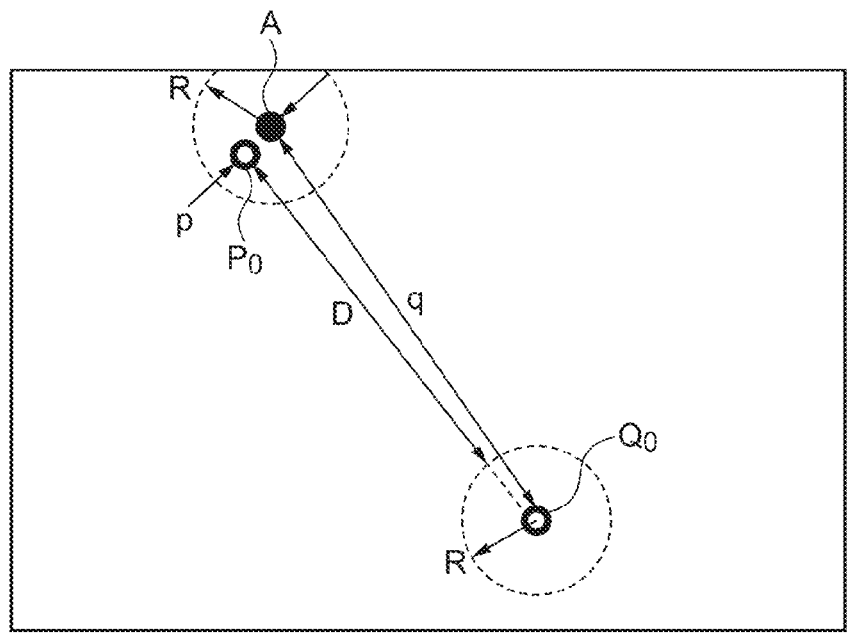
FIGS. 4A and 4B are schematic views showing focus moving control processing in the operation example shown in FIGS. 3A to 3D.

FIG. 4A shows the outline of processing of, when the user has designated two points on the screen, causing the control unit 108 to determine the next focusing target from the designated first and second touch positions. Let A be the object included in the first focusing target at the time of designation, and $P_0$ and $Q_0$ be the two designated points. Let p be the distance from the area where the object A is displayed on the screen to the point $P_0$, and q be the distance from the area where the object A is displayed on the screen to the point $Q_0$. Since p<q, and the point $P_0$ exists within a predetermined range from the object A (p<R), the control unit 108 determines that $P_0$ designates the first focusing target. In addition, since the point $Q_0$ is spaced apart from the object A by a predetermined distance or more (q>R), the control unit 108 determines that $Q_0$ designates the second focusing target. A predetermined amount (radius R) is subtracted from the distance between the points $P_0$ and $Q_0$ to obtain a distance D which is used for subsequent position control of the focus lens 102.

Figure 4B:
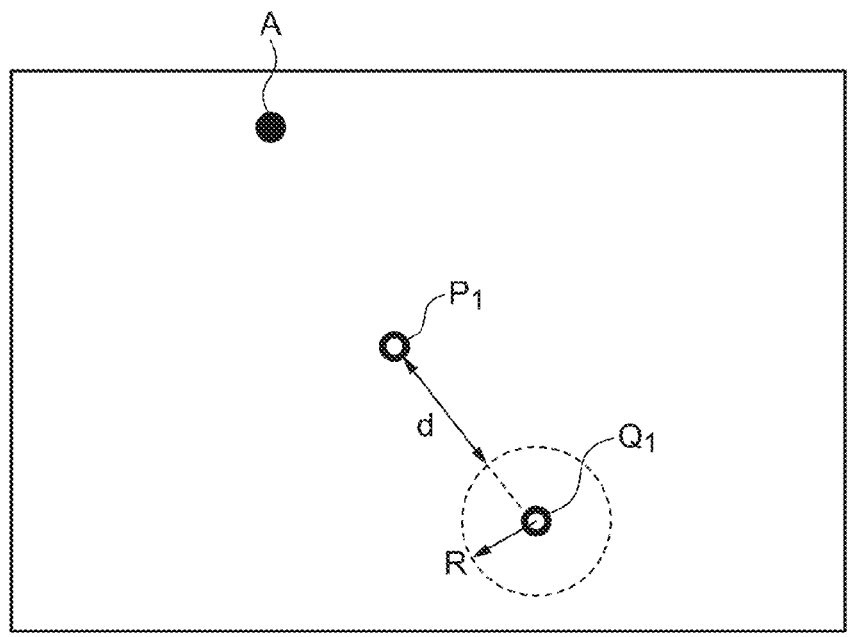

FIG. 4B shows the outline of processing of, when the user has moved one of the designated points close to the other, causing the control unit 108 to determine, from the two designated points, a parameter to be used to calculate the position of the focus lens 102. Starting from the two points $P_0$ and $Q_0$ designated first, the two designated points are tracked at a predetermined period. Let $P_1$ and $Q_1$ be two points designated at this point of time. A predetermined amount (radius R) is subtracted from the distance between the points $P_1$ and $Q_1$ to obtain a distance d which is used as a parameter to calculate the position of the focus lens 102 together with the distance D obtained previously.

Figure 5:
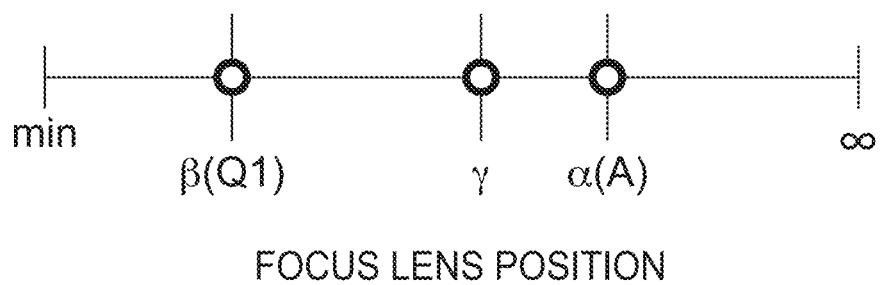
FIG. 5 is a view showing focus lens position control in the operation example shown in FIGS. 3A to 3D.

FIG. 5 shows the position of the focus lens 102. A position on the optical axis where the focal length is shortest is represented by min, and the position where the focal length is infinite is represented by ∞. Let α be the position of the focus lens that focuses on the first focusing target A before movement of the focus moving control, β be the position of the focus lens that focuses on the second focusing target $Q_1$ after movement, and γ be the position of the focus lens 102 during movement. The control unit 108 controls the position γ of the focus lens 102 to $(\alpha-\beta)\cdot d/D+\beta$.

<Control Procedure>

Focus moving control according to the first embodiment will be described with reference to FIGS. 6A and 6B.

Referring to FIG. 6A, in step S601, the control unit 108 waits for a new designation operation by the user.

In step S602, the control unit 108 determines whether there are two or more touch positions designated by the user. If one touch position is designated, focus moving control is not performed. In step S603, the focusing target is switched to the area of the object displayed at the designated touch position, and the process returns to step S601.

In step S604, the control unit 108 determines whether a focusing target already exists. If no focusing target exists, focus moving control is not performed. In step S605, the touch positions designated by the user are sorted in ascending order of distance to the screen center of the display unit 110. In step S606, the focusing target is set to the location of the object displayed at the touch position closest to the screen center, and the process returns to step S601.

In step S607, the control unit 108 sorts the touch positions designated by the user in ascending order of distance to the display position of the current first focusing target A on the screen.

In step S608, if the distance p between the focusing target A and a touch position P closest to the focusing target A does not fall within a predetermined range (R), the designation is not appropriate for focus moving control. Hence, the control unit 108 returns to step S601. When the distance between the focusing target A and a touch position Q farthest from the focusing target A does not fall within a predetermined range in step S609 as well, the control unit 108 returns to step S601.

In step S610, the control unit 108 sets, to D, the initial value of a distance obtained by subtracting the predetermined amount R from the distance between the touch positions P and Q, and substitutes D into the distance d during movement.

Figure 6B:
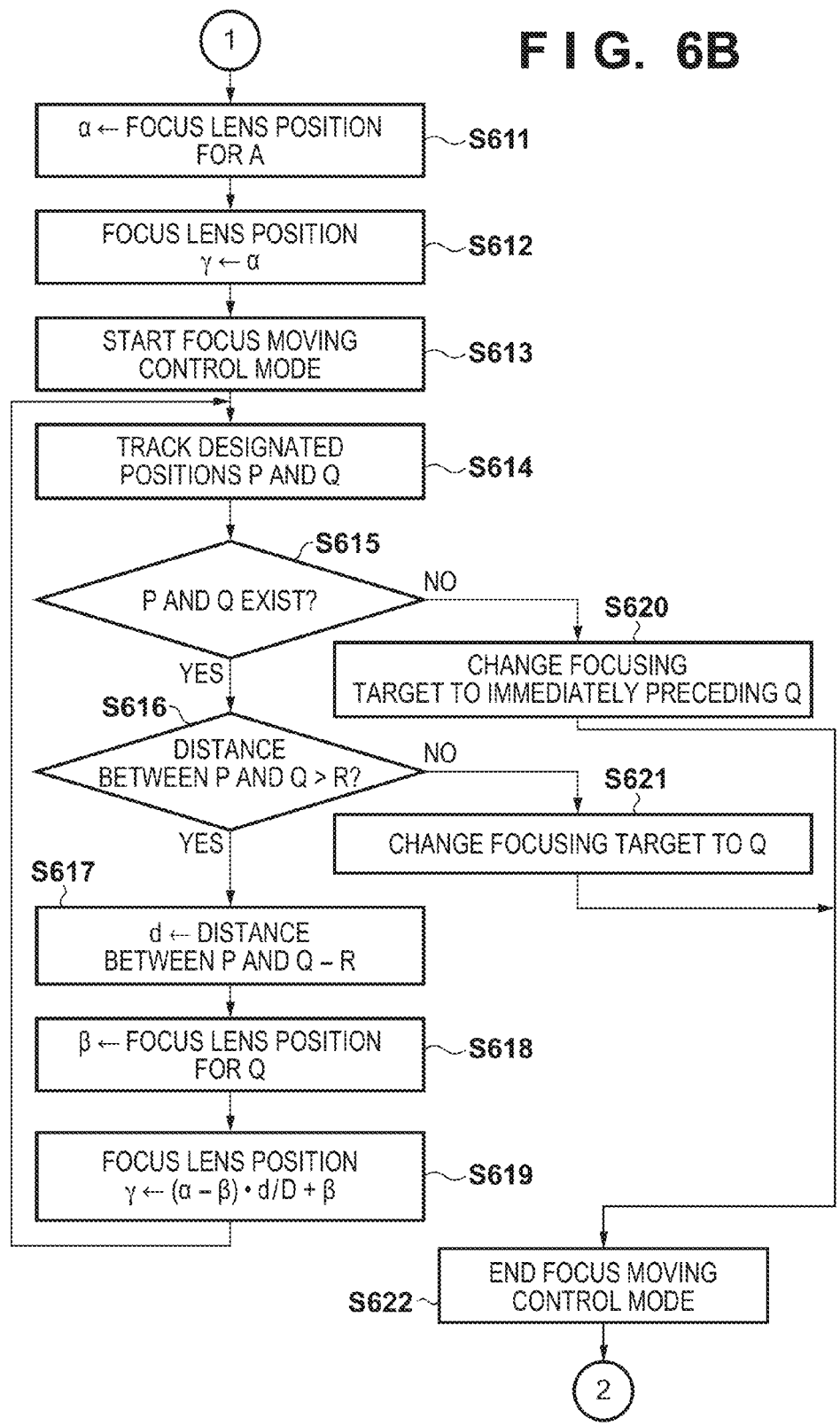

Referring to FIG. 6B, the control unit 108 sets the position of the focus lens that focuses on the object A to α in step S611, and substitutes α as the initial value of the position γ of the focus lens during movement in step S612.

In step S613, the control unit 108 starts the focus moving control mode. In this mode, display of the frames for the first focusing target A before movement, the object displayed at the touch position Q as the second focusing target after movement, and the touch position P during movement and display of a guide arrow are performed in parallel to the subsequent processing.

In step S614, the control unit 108 tracks the touch positions P and Q. Tracking is performed at a predetermined period, and the condition for successful tracking is that the change in the distance from the preceding touch position falls within a predetermined range. The predetermined period is assumed to be much shorter than the time in which the touch position moves by a predetermined distance.

In step S615, the control unit 108 determines whether the tracking of the touch positions P and Q is succeeding. If the tracking has failed for one of the touch positions, and the touch position is not present anymore, the location of the object displayed at the touch position Q immediately before the tracking failure is set to the focusing target in step S620, and the focus moving control ends.

In step S616, the control unit 108 determines whether the distance between the touch positions P and Q is larger than the predetermined amount R. If the distance is equal to or smaller than the predetermined amount R, the location of the object displayed at the touch position Q is set to the focusing target in step S621, and the focus moving control ends.

In step S617, the control unit 108 updates the distance d obtained by subtracting the predetermined amount R from the distance between the touch positions P and Q.

In step S618, the control unit 108 sets the position of the focus lens that focuses on the location of the object displayed at the touch position Q to β. In step S619, $(\alpha-\beta)\cdot d/D+\beta$ is substituted into the position γ of the focus lens during movement. The process then returns to step S614.

In step S622, the control unit 108 ends the focus moving control mode, erases the frames and arrows displayed during the focus moving control processing, and returns to step S601.

As described above, according to this embodiment, the user adjusts the focus area of a video under capturing by a simple operation so that it gradually changes while viewing the object under capturing. This enables capturing taking advantage of defocusing.

Second Embodiment

The second embodiment will be described next. The configuration of a camera according to this embodiment is the same as in the first embodiment except a user operation for focus moving control and focus lens position control in response to it, and a description thereof will be omitted.

Two types of operation examples will be described, mainly concentrating on the difference from the first embodiment.

First Operation Example

The first operation example of focus moving control by a camera 100 according to this embodiment will be described with reference to FIGS. 7A to 7D. In the first operation example, the user performs an operation of gradually moving the focus area to a new focusing target, as in the first embodiment.

Referring to FIG. 7A, a scene with two persons, a man and a woman in a flowery field is displayed as a captured object, as in FIG. 3A. A frame 701 indicates that a control unit 108 has selected the area of the flowery field on the near side displayed in the frame as the current first focusing target. In this case, this area is assumed to be in focus actually.

In FIG. 7B, the user touches two portions on both sides of the face of the woman by the index finger and the thumb which are sufficiently apart from each other, thereby designating the two points on the image displayed on a display unit 110. Frames 703 and 704 are displayed at these touch positions. A frame 702 displayed at the intermediate area between them so as to include the face of the woman indicates that the control unit 108 has determined that the area represents the second focusing target desired by the user.

Although the frame 702 is displayed at the intermediate point between the frames 703 and 704 in the above description, the present invention is not limited to this. For example, face recognition processing may be performed for the image displayed on the display unit 110. If a face exists between the frames 703 and 704, the frame 702 may be provided to surround the face. If a plurality of faces are detected, the face closest to the intermediate point between the frames 703 and 704 may be surrounded.

In FIG. 7C, the user moves the touch positions designated by the index finger and the thumb toward the face of the woman. The frames 703 and 704 are displayed at the touch positions during movement, indicating that the control unit 108 is tracking the touch positions. Control is performed to gradually move the touch positions in accordance with the speed of the change in the distance between the touch positions. In addition, arrows 705 and 706 are displayed as guides from the touch positions first designated by the index finger and the thumb to the frame 702 indicating the second focusing target.

FIG. 7D shows a display example when the distance between the touch positions the user has designated by the index finger and the thumb is smaller than a predetermined amount. This indicates that the control unit 108 has selected the frame 702 as the new focusing target, and the face of the woman is in focus. The focus moving control is completed, and the frames 701, 703, 704, and 705 and the arrows 705 and 706 are erased.

<Lens Position Control>

Processing of causing the control unit 108 to select a focusing target from two points designated by the user and calculate the position of a focus lens 102 in the focus moving control shown in FIGS. 7A to 7D will be described with reference to FIGS. 8A to 9.

Figure 8A:
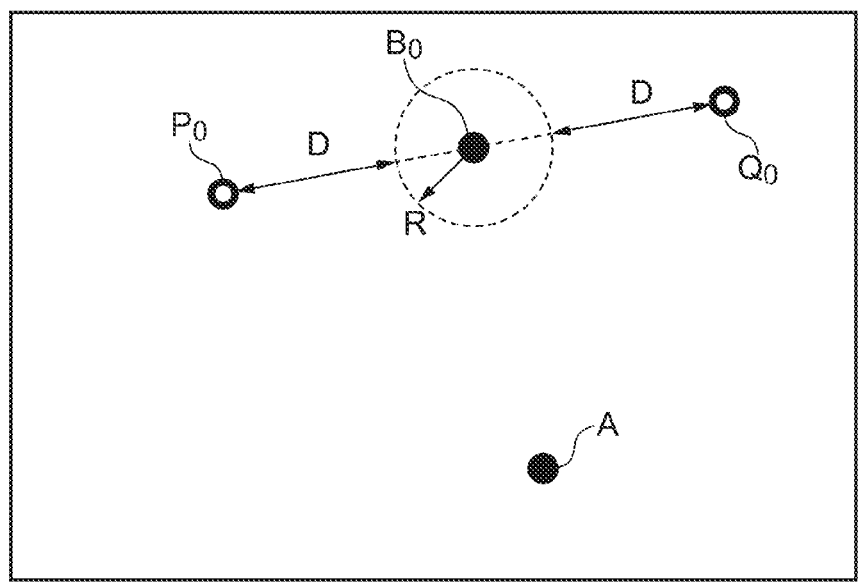
FIGS. 8A and 8B are schematic views showing focus moving control processing in the first operation example.

FIG. 8A shows the outline of processing of, when the user has designated two portions on the screen with fingers which are sufficiently apart from each other, causing the control unit 108 to determine the next focusing target from the designated two points. Let A be the object included in the focusing target at the time of designation, and $P_0$ and $Q_0$ be the two designated points. The control unit 108 determines that the location of the object displayed at an intermediate point $B_0$ between the points $P_0$ and $Q_0$ designates the next focusing target. A predetermined amount (radius R) is subtracted from the distance between the points $P_0$ and $B_0$ to obtain a distance D which is used for subsequent position control of the focus lens 102.

Figure 8B:
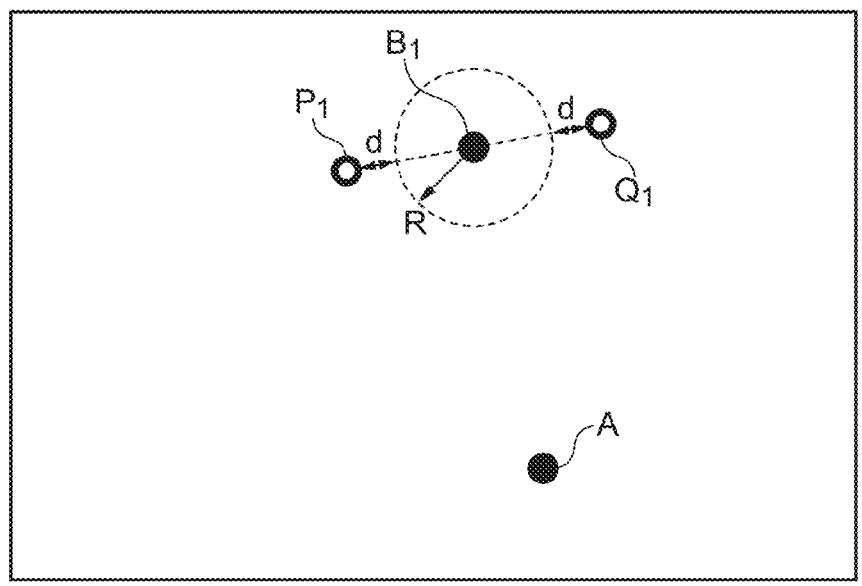

FIG. 8B shows the outline of processing of, when the user has moved the two designated points to decrease the distance between them, causing the control unit 108 to determine, from the two designated points, a parameter to be used to calculate the position of the focus lens 102. Starting from the two points $P_0$ and $Q_0$ designated first, the two designated points are tracked at a predetermined period. Let $P_1$ and $Q_1$ be two points designated at this point of time. When an intermediate point $B_1$ between the points $P_1$ and $Q_1$ has moved with respect to the first intermediate point $B_0$, the control unit 108 sets the location of the object displayed at the intermediate point $B_1$ to the next focusing target. The predetermined amount (radius R) is subtracted from the distance between the points $P_1$ and $B_1$ to obtain a distance d which is used as a parameter to calculate the position of the focus lens 102 together with the distance D obtained previously.

Figure 9:
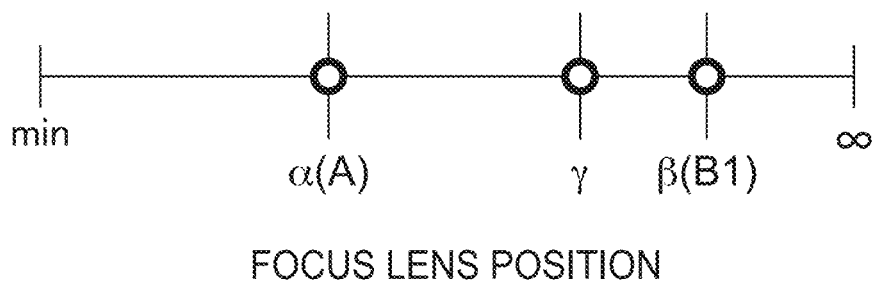
FIG. 9 is a view showing focus lens position control in the first operation example.

FIG. 9 shows the position of the focus lens 102. A position on the optical axis where the focal length is shortest is represented by min, and the position where the focal length is infinite is represented by ∞. Let $\alpha$ be the position of the focus lens that focuses on the focusing target before movement of the focus moving control, $\beta$ be the position of the focus lens that focuses on the focusing target after movement, and $\gamma$ be the position of the focus lens 102 during movement. The control unit 108 controls the position $\gamma$ of the focus lens 102 to $(\alpha-\beta)\cdot d/D+\beta$.

Second Operation Example

The second operation example of focus moving control by the camera 100 according to this embodiment will be described with reference to FIGS. 10A to 10D. In the second operation example, the user performs an operation of gradually moving the focus point so as to intentionally express a video in a defocus state in which no objects are in focus, unlike the first operation example.

Referring to FIG. 10A, a scene with two persons, a man and a woman in a flowery field, is displayed as a captured object, as in FIG. 7A. A frame 1001 indicates a state in which a control unit 108 has selected the area of the flowery field on the near side displayed in the frame as the current first focusing target.

In FIG. 10B, the user touches two portions on both sides of the face of the woman by the index finger and the thumb, thereby designating the two points on the image displayed on the display unit 110. Frames 1003 and 1004 are displayed at these touch positions. A frame 1002 displayed at the intermediate area between them so as to include the face of the woman indicates that the control unit 108 has determined that the area represents the second focusing target desired by the user. In this case, focus moving control is performed not to focus on the second focusing target because the user performs an operation of obtaining a blurred video later.

In FIG. 10C, the user opens the fingers to move the touch positions from the state in which the distance between the touch positions designated by the index finger and the thumb is smaller than a predetermined amount, as shown in FIG. 10B, thereby increasing the distance between the touch positions. The frames 1003 and 1004 are displayed at the touch positions designated by the moving index finger and thumb, indicating that the control unit 108 is tracking the touch positions. Control is performed to gradually set the focus point in the defocus state as the distance between the touch positions increases. In addition, arrows 1005 and 1006 are displayed as guides from the touch positions first designated by the index finger and the thumb to a touch position where a blurred video is obtained.

FIG. 10D shows a display example when the distance between the touch positions the user has designated by the index finger and the thumb is equal to or more than a predetermined amount. The frames disappear, indicating that the control target of the control unit 108 is not present anymore. Simultaneously, the focus moving control is completed in the defocus state in which the focus lens 102 has moved to the shortest focal length, and all the frames and arrows are erased.

<Lens Position Control>

Processing of causing the control unit 108 to select a focusing target from two points designated in response to a user operation and calculate the position of the focus lens 102 in the focus moving control shown in FIGS. 10A to 10D will be described with reference to FIGS. 11A to 12.

Figure 11A:
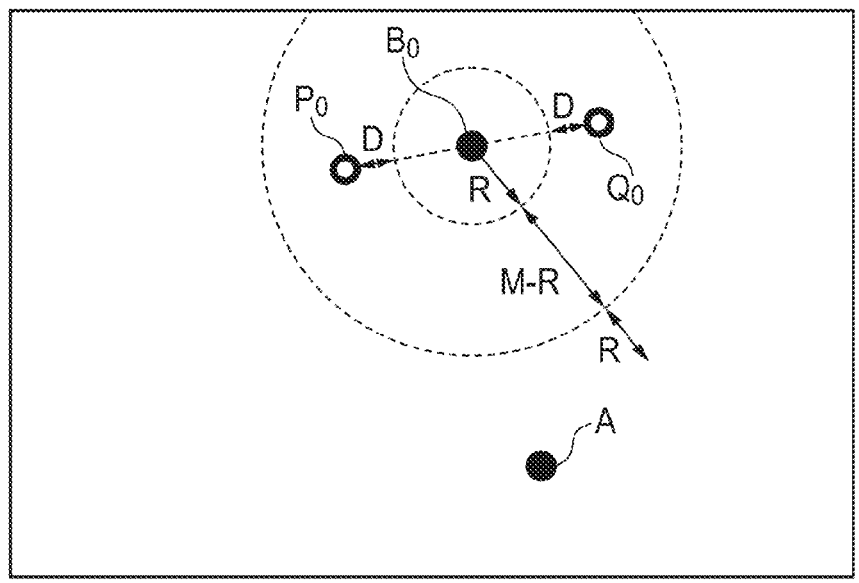
FIGS. 11A and 11B are schematic views showing focus moving control processing in the second operation example.

FIG. 11A shows the outline of processing of, when the user has designated two portions at a narrow interval on the screen by the fingers, causing the control unit 108 to determine the next focusing target from the designated two points. Let A be the object included in the focusing target at the time of designation, and $P_0$ and $Q_0$ be the two designated points. The control unit 108 determines that the location of the object displayed at the intermediate point $B_0$ between the points $P_0$ and $Q_0$ designates the next focusing target. The predetermined amount (radius R) is subtracted from the distance between the points $P_0$ and $B_0$ to obtain the distance D which is used as a parameter to calculate the position of the focus lens 102 later. In this operation example, since D is smaller than a predetermined amount M–R, the control unit 108 controls to move the focus point to the defocus state when the distance between the two designated points has become longer than in the initial state.

Figure 11B:
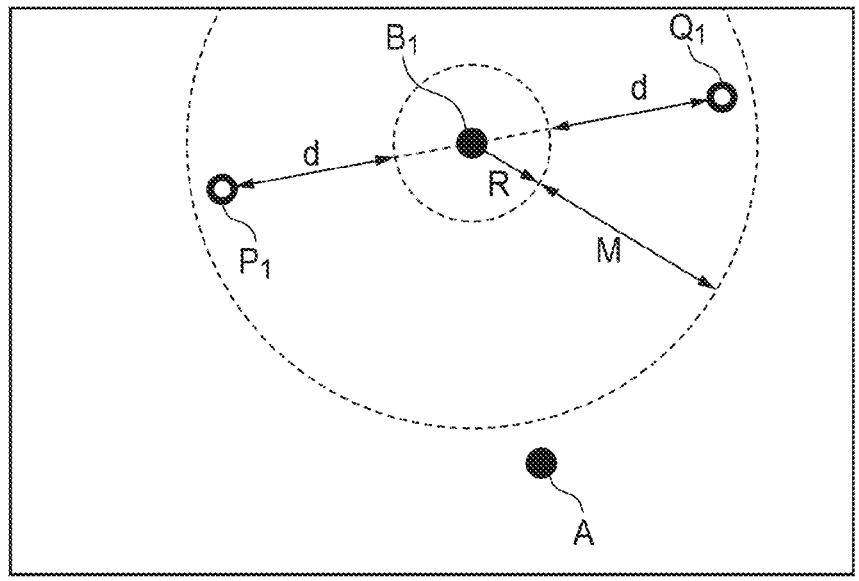

FIG. 11B shows the outline of processing of, when the user has moved the two designated points to increase the distance between them, causing the control unit 108 to determine, from the two designated points, a parameter to be used to calculate the position of the focus lens 102. Starting from the two points $P_0$ and $Q_0$ designated first, the two designated points are tracked at a predetermined period. Let $P_1$ and $Q_1$ be two points designated at this point of time, and $B_1$ be the intermediate point between them. The predetermined amount (radius R) is subtracted from the distance between the points $P_1$ and $B_1$ to obtain the distance d which is used as a parameter to calculate the position of the focus lens 102 together with the distance D obtained previously. When the distance d has reached the predetermined amount M, the defocus state in which the focus lens 102 has moved to the shortest focal length is obtained.

Figure 12:
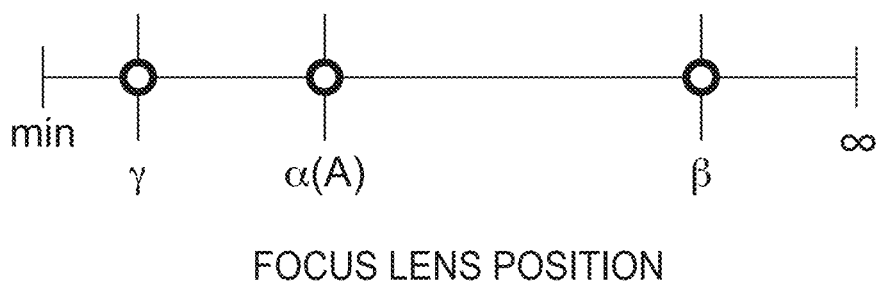
FIG. 12 is a view showing focus lens position control in the second operation example.

FIG. 12 shows the position of the focus lens 102. Let $\alpha$ be the position of the focus lens that focuses on the first focusing target A before movement of the focus moving control, $\beta$ be the position of the focus lens that focuses on the second focusing target B after movement, and $\gamma$ be the position of the focus lens 102 during movement. The control unit 108 controls the position $\gamma$ of the focus lens 102 to $(\min-\alpha)\cdot(d-D)/(M-D)+\alpha$.

<Control Procedure>

Focus moving control according to the first and second operation examples will be described with reference to FIGS. 13A and 13B.

Figure 13A:
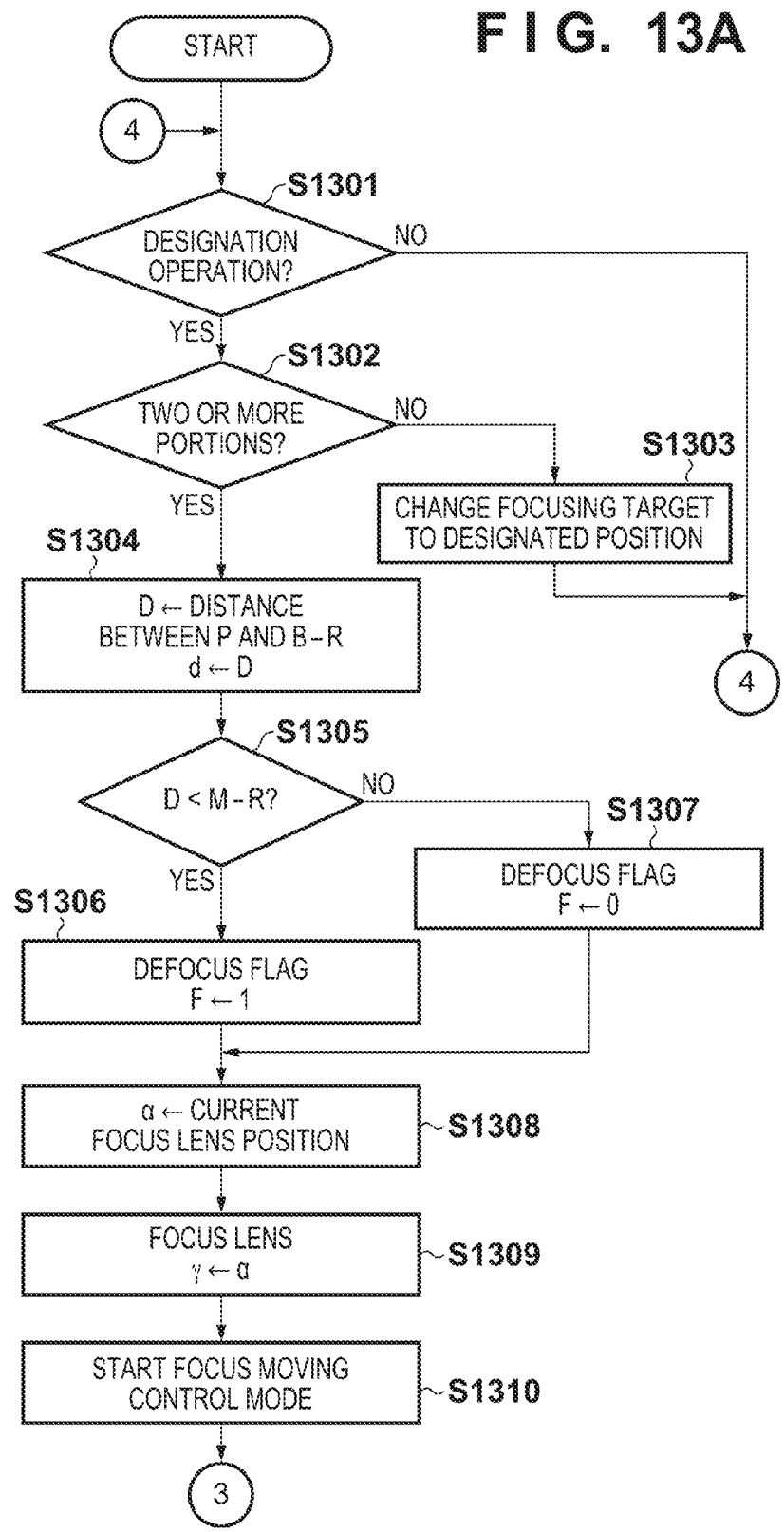
FIGS. 13A and 13B are flowcharts of focus moving control according to the second embodiment.

Referring to FIG. 13A, in steps S1301 to S1303, the same processing as in steps S601 to S603 of FIG. 6A is performed.

In step S1304, the control unit 108 sets, to D, the initial value of a distance obtained by subtracting the predetermined amount R from the distance between the touch position P during movement and an intermediate position B between the touch position P and the other touch position Q, and substitutes D into the distance d during movement.

In step S1305, the control unit 108 determines whether the distance D is smaller than the predetermined amount M−R. If the distance D is smaller than the predetermined amount, the control unit 108 substitutes 1 into a defocus flag F in step S1306. If the distance D is equal to or more than the predetermined amount, the control unit 108 substitutes 0 into the defocus flag F in step S1307. This flag means that when the distance between the two touch positions is smaller than the predetermined amount, control to the defocus state is performed in the subsequent processing by moving the touch positions to increase the distance between the touch positions.

The control unit 108 sets the position of the focus lens that focuses on the current first focusing target A to α in step S1308, and substitutes α as the initial value of the position γ of the focus lens during movement in step S1309.

In step S1310, the control unit 108 starts the focus moving control mode. In this mode, display of the frames for the first focusing target A before movement, the focusing target B after movement, and the touch positions P and Q during movement and display of guide arrows are performed in parallel to the subsequent processing.

Figure 13B:
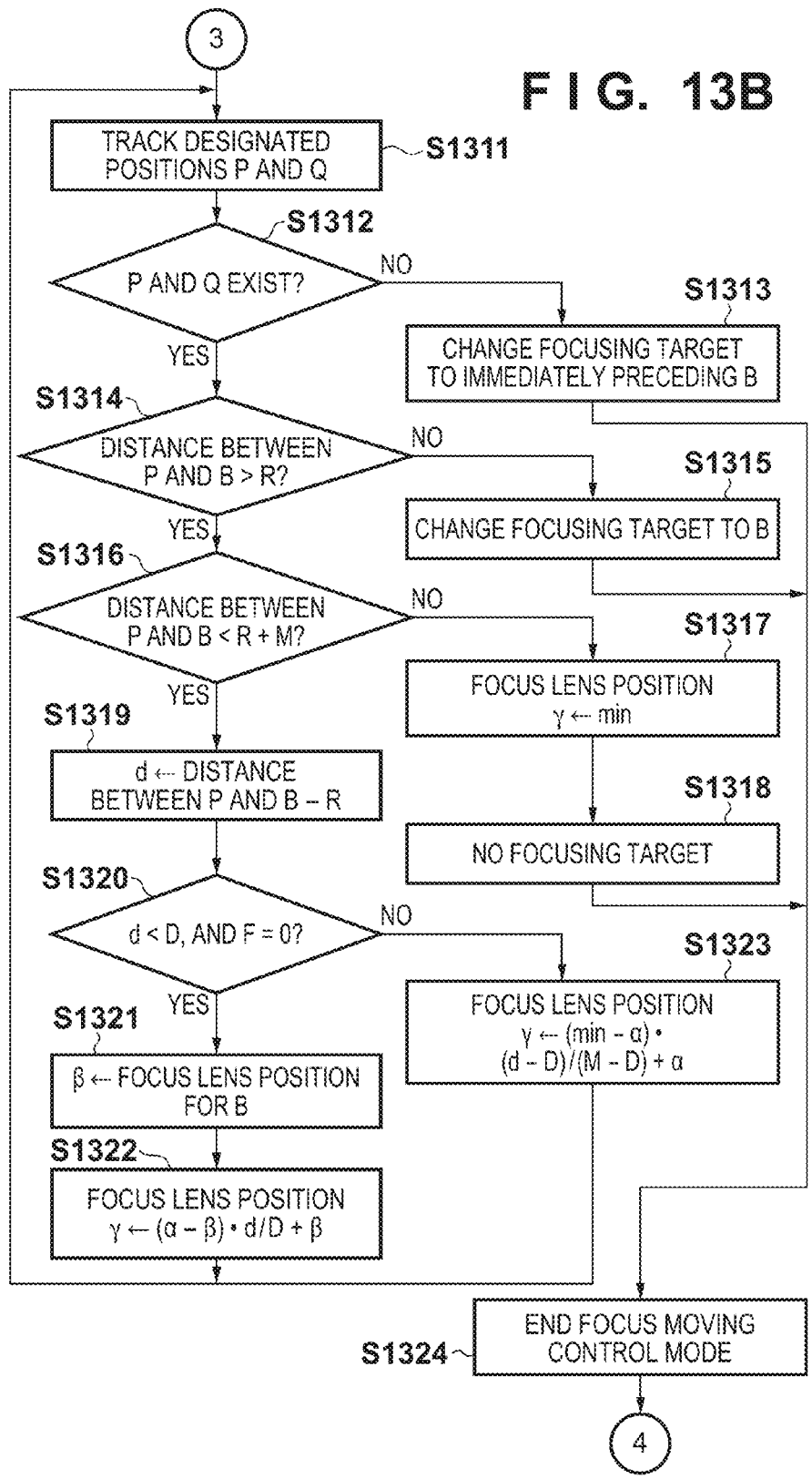

Referring to FIG. 13B, in step S1311, the control unit 108 tracks the positions P and Q designated by the user. Tracking is performed at a predetermined period, and the condition for successful tracking is that the change in the distance from the preceding touch position falls within a predetermined range. The position of the intermediate position B between the touch positions P and Q is also updated in accordance with the tracking.

In step S1312, the control unit 108 determines whether the tracking of the touch positions P and Q is succeeding. If the tracking has failed for one of the touch positions, and the touch position is not present any more, the location of the object displayed at the position B immediately before the tracking failure is set to the focusing target in step S1313, and the focus moving control ends.

In step S1314, the control unit 108 determines whether the distance between the touch position P and the position B is larger than the predetermined amount R. If the distance falls within the predetermined range R, the location of the object displayed at the position B is set to the focusing target in step S1315, and the focus moving control ends.

In step S1316, the control unit 108 determines whether the distance between the touch position P and the position B is smaller than the predetermined amount R+M. If the distance falls outside the predetermined range R+M, the focus lens position γ is set to the focus lens position min with the shortest focal length in step S1317, and the focus moving control ends. In step S1318, no focusing target is set.

In step S1319, the control unit 108 updates the distance d obtained by subtracting the predetermined amount R from the distance between the touch position P and the position B.

In step S1320, the control unit 108 determines whether d<D and F=0. If these conditions are satisfied, processing of gradually moving the focus point to the next focusing target is performed. If the conditions are not satisfied, processing of gradually moving the focus point to the defocus state is performed.

If the conditions are satisfied in step S1320, the control unit 108 sets the position of the focus lens that focuses on the position B to β in step S1321. In step S1322, (α−β)·d/D+β is substituted into the position γ of the focus lens during movement. The process then returns to step S1311.

On the other hand, if the conditions are not satisfied in step S1320, the control unit 108 substitutes (min−α)·(d−D)/(M−D)+α into the position γ of the focus lens during movement in step S1323. The process then returns to step S1311.

In step S1324, the control unit 108 ends the focus moving control mode, erases the frames and arrows displayed during the focus moving control processing, and returns to step S1301.

As described above, according to this embodiment, it is possible to intentionally express a video in a defocus state in which no objects are in focus. In addition, when a focus area is designated on the display screen using an operation member such as a touch panel, the user can designate a desired focus area without temporarily hiding the focusing target object with a finger or the like and missing a motion or facial expression.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-205234, filed Sep. 20, 2011, which is hereby incorporated by reference herein in its entirety.

What is claimed is:

1. An image capturing apparatus comprising:
   an image sensor configured to capture continuous video images of an object via an optical system;
   a display unit configured to display the images captured by said image sensor on a screen, the displayed images having a current auto-focusing target position;
   a touch panel configured to simultaneously detect a first touch position and a second touch position having a distance from the first touch position on the screen on which the images are displayed, the first touch position being the current auto-focusing target position of the images and the second touch position being a new auto-focusing target position of the images; and
   a processor configured to gradually adjust the in-focus position of the images from the current auto-focusing target position to the new auto-focusing target position in accordance with a reduction in the distance between the first touch position and the second touch position.

2. The apparatus according to claim 1, wherein said processor adjusts the in-focus position of the images from the current auto-focusing target position to the new auto-focusing target position immediately, if the distance between the first touch position and the second touch position is smaller than a predetermined amount.

3. The apparatus according to claim 1, wherein said processor gradually adjusts the in-focus position of the images from the current auto-focusing target position to the new auto-focusing target position in accordance with a speed at which the distance between the first touch position and the second touch position changes.

4. A control method of an image capturing apparatus which comprises an image sensor configured to capture continuous video images of an object via an optical system, and a display unit configured to display the image captured by the image sensor on a screen, the displayed images having a current auto-focusing target position, the method comprising:
   a detection step of simultaneously detecting a first touch position and a second touch position having a distance from the first touch position on the screen on which the images are displayed, the first touch position being the current auto-focusing target position of the images and the second touch position being a new auto-focusing target position of the images; and
   an adjusting step of gradually adjusting the in-focus position of the images from the current auto-focusing target position to the new auto-focusing target position in accordance with a reduction in the a distance between the first touch position and the second detected touch position.

5. The method according to claim 4, wherein in the adjusting step, the in-focus position of the images is adjusted from the current auto-focusing target position to the new auto-focusing target position immediately, if the distance between the first touch position and the second touch position is smaller than a predetermined amount.

6. The method according to claim 4, wherein in the adjusting step, the in-focus position of the images is gradually adjusted from the current auto-focusing target position to the new auto-focusing target position in accordance with a speed at which the distance between the first touch position and the second touch position changes.

7. A non-transitory computer-readable storage medium storing a program for causing a computer to execute the control method according to claim 4.

8. An image capturing apparatus comprising:
   an image sensor configured to capture continuous video images of an object via an optical system;
   a display unit configured to display the images captured by said image sensor on a screen, the displayed images having a current auto-focusing target position;
   a touch panel configured to simultaneously detect a first touch position and a second touch position having a distance from the first touch position on the screen on which the images are displayed;
   a processor configured to select an object displayed between the first touch position and the second touch position as a new auto-focusing target position; and
   the processor configured to gradually adjust the in-focus position of the images from the current auto-focusing target position to the new auto-focusing target position in accordance with a reduction in the distance between the first touch position and the second touch position.

9. The apparatus according to claim 8, wherein said processor gradually adjusts the in-focus position of the images from the current auto-focusing target position to the new auto-focusing target position in accordance with the speed at which the distance between the first touch position and the second touch position changes.

10. A control method of an image capturing apparatus which comprises an image sensor configured to capture continuous video images of an object via an optical system, and a display unit configured to display the images captured by the image capturing means on a screen, the displayed images having a current auto-focusing target position,
    the method comprising:
    a detection step of simultaneously detecting a first touch position and a second touch position having a distance from the first touch position on the screen on which the images are displayed;
    a selection step of selecting an object displayed between the first touch position and the second touch position as a new auto-focusing target position; and
    an adjusting step of gradually adjusting the in-focus position of the images from the current auto-focusing target position to the new auto-focusing target position in accordance with a reduction in the distance between the first touch position and the second touch position.

11. The method according to claim 10, wherein in the adjusting step, the in-focus position of the images is adjusted from the current auto-focusing target position to the new auto-focusing target position in accordance with a speed at which the distance between the first touch position and the second touch position changes.

12. A non-transitory computer-readable storage medium storing a program for causing a computer to execute the control method according to claim 10.

* * * * *